3,063,976
POLYMERS OF ALKYL VINYLBENZYL ETHERS
John G. Abramo, Springfield, Mass., assignor to Monsanto Chemical Company, St. Louis, Mo., a corporation of Delaware
No Drawing. Filed Mar. 25, 1960, Ser. No. 17,497
5 Claims. (Cl. 260—80.3)

The present invention relates to synthetic polymers and more particularly to synthetic polymers exhibiting elastomeric properties.

From the standpoint of reproducibility of properties, or product control, synthetic polymers represent a distinct advantage over natural polymers. This is true in all segments of the polymer field, including that area whose efforts are directed to rubbers and synthetic polymers exhibiting elastomeric properties, the latter being referred to on occasion as synthetic elastomers. As a consequence, practitioners in the rubber art are continually searching for synthetic polymers exhibiting the elastomeric characteristics of rubber.

Accordingly, it is a principal object of this invention to provide synthetic polymers exhibiting elastomeric properties.

Other objects of the invention will in part be obvious and will in part appear hereinafter.

These and other objects of the present invention are attained in synthetic polymers consisting of alkyl vinylbenzyl ethers having the structure:

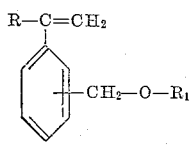

wherein R is selected from the class consisting of hydrogen and methyl radical and $R_1$ is an alkyl radical selected from the class consisting of alkyl radicals, the longest continuous chain of which contains 6–12 carbon atoms.

The following examples are given in illustration of the invention. Where parts are mentioned, parts by weight are intended unless otherwise described.

Example I

Two grams of n-hexyl p-vinylbenzyl ether containing 0.1 gram of ditertiary butyl peroxide is sealed in a glass tube which is flushed with nitrogen and then heated at 120° C. for 15 hours. A white, solid, elastomeric material is obtained after soaking in methanol solvent, to remove unreacted monomer, and drying of the same.

Example II

Two grams of 2-ethylhexyl p-vinylbenzyl ether containing 0.1 gram of ditertiary butyl peroxide is sealed in a glass tube which is flushed with nitrogen and then heated at 100° C. for 20 hours. The reaction product is soaked in methanol to remove monomer. A white, solid, elastomeric material is obtained upon drying.

Example III

Two grams of decyl p-vinylbenzyl ether containing 0.1 gram of ditertiary butyl peroxide is sealed in a glass tube which is flushed with nitrogen and then heated at 120° C. for 15 hours. A gelled elastomeric material is obtained after removal of monomer and drying.

Example IV

A solution of 2 grams of hexyl p-isopropenyl-benzyl ether, 2 grams of 2-ethylhexyl o-vinylbenzyl ether and 0.2 gram of ditertiary butyl peroxide is sealed in 8 mm. tubing which has been flushed with nitrogen and then is heated at 130° C. for 16 hours. The resulting elastomeric polymer is heated with methanol at reflux to extract any unreacted monomer. The polymer is then dried to form a white rubbery solid.

The alkyl vinylbenzyl ethers which can be used as monomeric components in the present invention include those having the structure:

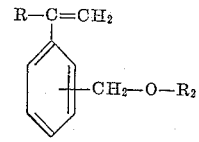

wherein $R_1$ is selected from the class consisting of hydrogen and methyl radicals and $R_2$ is an alkyl radical selected from the class consisting of those containing 6–12 carbon atoms on the longest continuous chain. The alkyl radical represented by $R_2$ is also a saturated alkyl radical and can be straight or branched in nature. The preferred ether as reflecting the preferred polymer is the 2-ethylhexyl p-vinylbenzyl ether. The preferred polymer is more specifically the homopolymer of 2-ethylhexyl p-vinylbenzyl ether. Representative of the subject ethers are the hexyl o-vinylbenzyl ethers, hexyl m-vinylbenzyl ethers and hexyl p-vinylbenzyl ethers through the dodecyl o-vinylbenzyl ethers, dodecyl m-vinylbenzyl ethers and the dodecyl p-vinylbenzyl ethers when $R_1$ represents hydrogen; and when $R_1$ represents a methyl radical the hexyl o-isopropenyl benzyl ether, hexyl m-isopropenyl benzyl ether, hexyl p-isopropenyl benzyl ethers, through the dodecyl o-isopropenyl benzyl ethers, dodecyl m-isopropenyl benzyl ethers and dodecyl p-isopropenyl benzyl ethers.

Those ethers in which the alkyl radical represented by symbol $R_1$ is of the branched type are illustrated by 2-ethylhexyl o-vinylbenzyl ethers, 2-ethylhexyl m-vinylbenzyl ethers, 2-ethylhexyl p-vinylbenzyl ethers, 2-ethylhexyl o-isopropenyl benzyl ethers, 2-ethylhexyl m-isopropenyl benzyl ethers and 2-ethylhexyl p-isopropenyl benzyl ethers. Various simple substituents such as the halogens and alkyl radicals can also be accommodated on the phenyl radical, to provide alkyl vinylbenzyl ethers intended to be included herein. Additionally, while homopolymers of each of the ethers are principally intended, mixtures of the identified ethers to form copolymers restricted in composition to the ethers defined above are also intended here. The subject ethers can be produced in the manner set forth in copending application S.N. 747,828 filed July 11, 1958, in the name of John G. Abramo.

The polymers of the present invention can be prepared using mass, solution or emulsion polymerization techniques.

In the mass and solution polymerizations, the monomeric ethers are subjected to heating at about 50 to 200° C. under at least autogenous pressure until they become polymerized. Polymerization can be thermally initiated but it is preferred to employ a small quantity of a free radical polymerization initiator such as for example hydrogen peroxide, ditertiarybutyl peroxide, benzoyl peroxide, tertiary butyl perbenzoate, pinacolone peroxide, ditertiary butyl hydroperoxide, azo-bis-isobutyronitrile, etc. The amount of such initiator employed will generally fall within the range of about 0.05 to 5.0 parts by weight per 100 parts of total monomers. This may, however, be varied.

The solvents suitable for use in the solution type of polymerization are organic liquids which are inert to the reaction, e.g., toluene, xylene, benzene, dioxane, etc.

In the emulsion polymerization, the monomers are continuously and slowly added to an excess of water maintained at a polymerization temperature of 30 to 150° C.

and autogenous pressure. An emulsifying agent and a polymerization catalyst are necessary in carrying out this type of polymerization. Either or both can be initially present in the water in whole or in part, or added as an aqueous solution together with the monomeric mixtures. The amount of water to be used can be varied within wide limits. It is generally preferable, however, to use from about 100 to 300 parts of water per 100 parts of monomeric mixture in order to obtain aqueous polymer latices constituting from 25 to 50% solids by weight.

The identity of the emulsifying agents can be varied. They can be nonionic, anionic or cationic. Those which operate satisfactorily either alone or in mixtures thereof include salts of high molecular weight fatty acids, quaternary ammonium salts, alkali metal salts of rosin acids, alkali metal malts of long-chain sulfates and sulfonates, ethylene oxide condensates of long-chain fatty acids, alcohols or mercaptans, sodium salts of sulfonated hydrocarbons, aralkyl sulfonates, etc. Representative of emulsifiers which can be used are sodium laurate, triethanolamine, sodium lauryl sulfate, 2-ethylhexyl esters of sulfosuccinic acid, sodium salt of dioctyl sulfosuccinic acid, etc. Generally from about 0.1 to 5.0 parts by weight of emulsifier per 100 parts of total monomer operates quite satisfactorily.

Polymerization initiators or catalysts suitable for use in the emulsion-type polymerizations designed to produce the polymers of the present invention include free radical initiators such as potassium persulfate, cumene hydroperoxide, ammonium persulfate as well as various of the redox-type catalyst systems represented by combinations of any of hydrogen peroxide, potassium persulfate, cumene hydroperoxide, tertiarybutylisopropyl benzene hydroperoxide, diisopropylbenzene hydroperoxide, etc. With any of potassium ferricyanide, dihydroxyacetone, sodium formaldehyde sulfoxylate, triethanolamine, glucose, fructose, etc. The amount of initiator utilized conveniently can range from about 0.05 to 5.0 parts by weight per 100 parts of total monomer.

The synthetic polymers of the present invention are clear, essentially colorless elastomeric materials which can be used in linear form or as obtained from any of the mass, solution or emulsion processes described above to provide a variety of film, coating, molding, etc., applications in which rubbery or elastomeric properties are desired. They can be vulcanized by a process involving intimately mixing the polymer in dry form with free-radical catalysts such as benzoyl peroxide, ditertiary butyl peroxide and the like followed by heating the mixture at elevated temperatures in preferably an inert atmosphere. In vulcanized form, the polymers retain their elastomeric properties while gaining improvement in the properties of solvent resistance, strength etc.

In either the linear or vulcanized (cross-linked) forms the polymers of the present invention exhibit superior resistance to light or air or oxygen degradation, when compared to synthetic elastomers based on dienes. This is particularly significant in view of the tremendous acceptance which the diene based elastomers have received as supplements and substitutes for natural rubber. The superiority of the polymers of the present invention can be attributed to the fact that the polymers of the present invention do not retain unsaturation while the polymers based on the dienes do.

The polymers of the present invention can also be compounded with various fillers and adjuncts such as colorants, etc.

It will thus be seen that the objects set forth above among those made apparent from the preceding description are efficiently attained and since certain changes may be made in carrying out the above process and in the polymer products which result without departing from the scope of the invention, it is intended that all matter contained in the above description shall be interpreted as illustrative and not in a limiting sense.

What is claimed is:

1. Synthetic elastomeric polymers of monomers consisting of alkyl vinylbenzyl ethers having the structure:

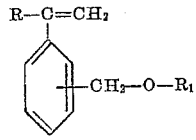

wherein R is selected from the class consisting of hydrogen and methyl radical and $R_1$ is selected from the class consisting of alkyl radicals the longest continuous chain of which contains 6–12 carbon atoms, in polymerized form.

2. An elastomeric polymer as in claim 1 wherein the alkyl vinylbenzyl ether is n-hexyl p-vinylbenzyl ether.

3. An elastomeric polymer as in claim 1 wherein the alkyl vinylbenzyl ether is 2-ethylhexyl p-vinylbenzyl ether.

4. An elastomeric polymer as in claim 1 wherein the alkyl vinylbenzyl ether is decyl p-vinylbenzyl ether.

5. An elastomeric polymer as in claim 1 wherein the alkyl vinylbenzyl ether is a mixture of hexyl p-isopropenyl benzyl ether and 2-ethylhexyl o-vinylbenzyl ether.

References Cited in the file of this patent
UNITED STATES PATENTS
2,522,501    Brooks _____ Sept. 19, 1950